J. A. CAREY.
PLATE TWIRLER FOR ENGRAVERS.
APPLICATION FILED DEC. 2, 1920.

1,424,986.

Patented Aug. 8, 1922.

WITNESSES
J. Herbert Bradley.
Wm. H. Parmelee.

INVENTOR
James A. Carey
by Clarke & Doolittle
his attorneys.

UNITED STATES PATENT OFFICE.

JAMES A. CAREY, OF PITTSBURGH, PENNSYLVANIA.

PLATE TWIRLER FOR ENGRAVERS.

1,424,986.  Specification of Letters Patent.  Patented Aug. 8, 1922.

Application filed December 2, 1920. Serial No. 427,908.

*To all whom it may concern:*

Be it known that I, JAMES A. CAREY, a citizen of the United States, residing at Pittsburgh, county of Allegheny, and State of Pennsylvania, have invented certain new and useful Improvements in Plate Twirlers for Engravers, of which the following is a specification.

My invention relates to a device particularly useful for photo-engraving establishments for "twirling" plates.

In photo-engraving establishments it is customary for the engraver to prepare his copper or other metal plates with a suitable surface for receiving the half-tone reproduction from a photographic negative. This is done by applying a sensitive coating to the copper plate that has been cut to suitable size, after which the coating must be evenly distributed over the surface of the plate and dried. For this purpose, the plate is held in a substantially horizontal plane and rapidly rotated or twirled over a suitable source of heat. This twirling distributes the coating evenly over the plate while the excess is thrown off centrifugally, after which the heat dries the coating into the plate.

Twirling apparatus as heretofore used has usually been rather crudely constructed, comprising usually a gas burner suitably supported in a part of the shop set off by partitions that serve to prevent any of the excess coating that is thrown off while the plate is being twirled being scattered about the shop. The twirler for holding the plates is usually a device operated by hand and held in position by hand. The work is therefore tiresome, and unpleasant for the operator, due to the heat of the flame. Furthermore, the coating on the plate may be burned or unevenly heated.

A further disadvantage of the usual type of twirler is that in many cities, especially those dependent on natural gas, the supply of gas for industrial purposes is often insufficient, particularly in the winter, and engravers in such cities find it difficult to obtain sufficient heat in the various burners which they require.

It is an object of the present invention to provide an improved plate holding device for supporting the plates while they are being twirled.

It is a further object of the invention to provide an automatic twirling device for rotating the plate.

A further object of the invention is to provide an oven for supporting the twirler, which oven is preferably heated electrically.

These and other objects are obtained by my invention, which comprises, broadly, a plate holding device adjustable to plates of different sizes, detachably connected to a shaft adapted to be driven by an electric motor. The plate holder is housed in an oven which is preferably electrically heated and equipped with temperature controlling devices.

My invention may be more fully described in connection with the accompanying drawings, in which.

Figure 1:
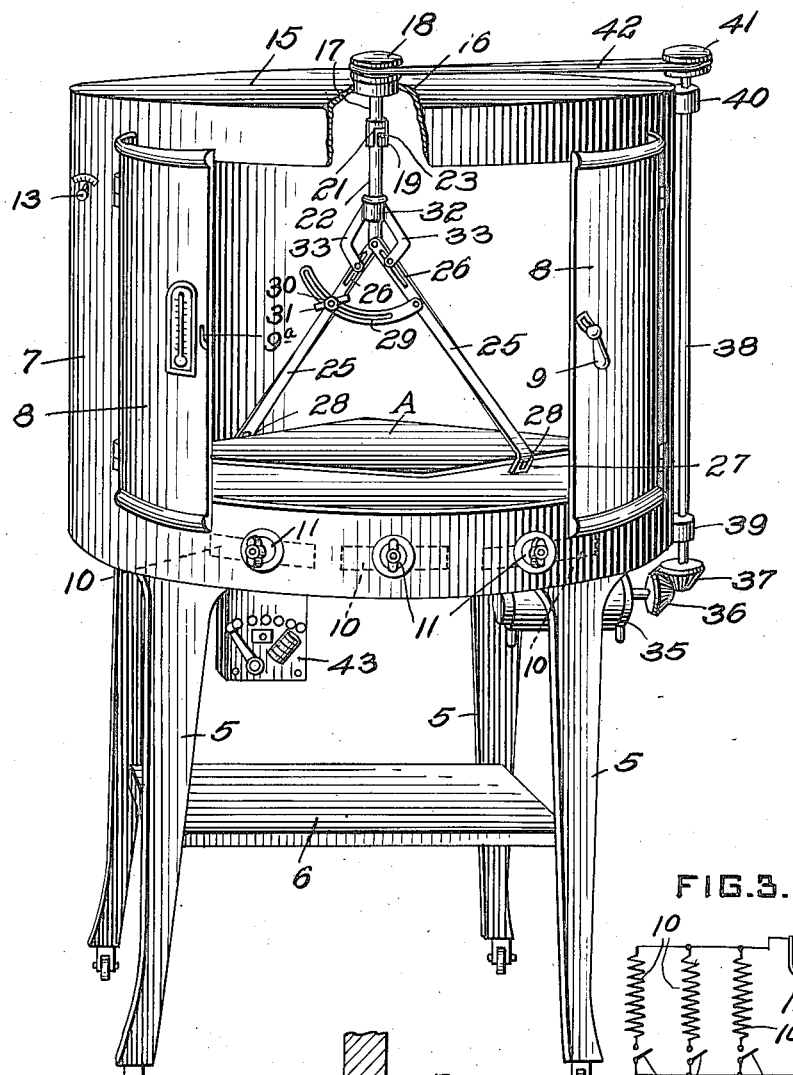
Fig. 1 shows a front view of the twirler and oven in perspective.
Figure 3:
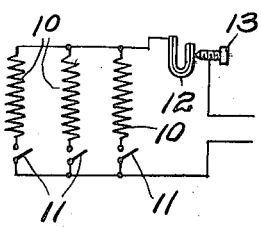

Fig. 3 indicates a diagram of wiring suitable for the heater.

Referring to the drawings, 5 are legs for supporting the device, and 6 is a shelf connected to the legs. On the legs is an oven 7 which is preferably circular in shape and which may be lined with heat insulating material. In the side of the oven is an opening provided with curved doors 8 adapted to form a closure therefor. The doors may be fastened in closed position by means of any suitable fastener, such as pivoted handle 9 on one door, having means thereon for engaging a suitable shackle $9^a$ on the other door.

In the lower part of the oven are one or more heating units with means at the outside of the oven for controlling them. I prefer to use electric heating elements 10 of the resistance type, as shown, with individual controlling means 11 for each unit. As shown in the diagram in Fig. 3, the units are connected in parallel and a thermostat 12 is located in one of the lines for breaking the circuit when the temperature of the oven reaches a predetermined maximum. The thermostat may be adjusted from the outside of the oven by a rotatable or other suitable element 13. The thermostat and wiring circuits are diagrammatic, and it is obvious that other means for heating and controlling the temperature of the oven could be used.

The top 15 of the oven is provided at or near its center with a thrust bearing 16 in which is journalled a shaft 17 having a pulley 18 on the projecting top end thereof through which the shaft is driven. The lower end of said shaft 17 depends in the oven chamber and is provided with a socket formed of an annular depending flange 19 within which is a recess 20. The flange 19 is slotted as shown at 21.

Figure 2:
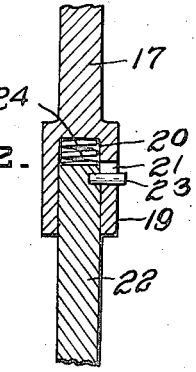
Fig. 2 shows in detail the detachable coupling between the twirler and driven shaft.

The plate holding device or twirler is adapted to be detachably suspended from this shaft. It comprises a shaft or rod member 22 having a transverse pin 23 near the upper end thereof, adapted to engage in the slot 21 to detachably hold the rod in place. For insuring against the accidental removal of the rod from the socket, a spring 24 may be secured in the socket to press downwardly on the end of said rod when it is in position, as shown in Fig. 2.

Pivoted to the lower end of the rod 22 are a plurality of preferably two, legs 25, having slots 26 therein near their upper ends. The lower ends thereof are flattened out and bent to form hooks 27 adapted to engage the edges of the plate A. The hooked portions are also preferably provided with openings 28, so that the corners of the plate may be placed therein and the plate supported at the corners rather than at points intermediate thereof. One of the legs 25 has a slotted segment 29 pivoted thereto, and a threaded pin 30 on the other leg 25 engages in the slot and is provided with a wing nut 31 which serves as a clamp. By means of this arrangement, the legs 25 may be adjusted to engage plates of various sizes, and then clamped in such position.

In order to keep the legs centrally positioned and to prevent their swinging, a sleeve 32 slidable on rod 22 is provided, and from this sleeve depend arms 33 which have pins on the extremities thereof adapted to engage in slots 26 in legs 25. The sleeve 32 will move upwardly or downwardly as the legs 25 are spread or closed, but the arms 33, being rigidly connected to the sleeve, will always tend to keep the legs properly centered.

For rotating the twirler a motor 35 is secured to the oven or frame, preferably beneath the oven. It is provided with a driving pinion 36 which meshes with a gear 37 on a vertical shaft 38 which extends upwardly along one side of the oven and is journalled in suitable bearings 39 and 40. On the projecting upper end of the shaft 38 is a pulley 41. A belt 42 serves as a driving connection between pulley 41 and pulley 18 on the centrally positioned shaft 17. A suitable switch for controlling the motor 42 is indicated at 43.

In use, the plate holder may be first removed from the oven and the plate A which has been cut to proper size and coated is clamped in the holder. The plates are generally copper or zinc. The holder may then be returned to the oven, and the end of the rod 22 secured in the socket formed in the shaft 17. The doors 8 are then closed and the plate rotated through the mechanism described. At the same time, the interior of the oven will be heated by the heating units or elements 10.

In view of the fact that the temperature of the oven may be regulated, there is little liability of burning the coating or heating it excessively, and it is not necessary for the operator to continuously watch the plate. After a little experience, he can readily estimate the time it should take for a plate of a given size to be dried. Furthermore, because the plate is enclosed while being twirled, it is not liable to collect dust and dirt which, if deposited on the coating, give an uneven surface.

While I have described my invention as being particularly useful to engravers, I do not limit myself to such use. Furthermore, I do not limit myself necessarily to the use of electricity as a heating medium, as it could be heated by gas or other fuel.

What I claim is:

1. A twirling device comprising a rod member, a plurality of legs pivoted to one end of said rod member and adjustable to- and from each other, means for clamping said legs in adjusted positions, and means for rotating the rod member.

2. A twirling device comprising a rod member, a plurality of legs pivoted to one end of said rod member and adjustable to- and from each other, means for clamping said legs in adjusted positions, means for rotating the rod member, and means for preventing the legs from swinging.

3. A twirling device comprising a rod member, a pair of legs pivoted to one end of said rod member and adjustable toward and from each other, means for clamping said legs in adjusted positions, means for preventing the legs from swinging, said means comprising a member slidable on said rod member and having arms thereon slidably engaging said legs, and means for rotating the rod member.

4. A twirling device comprising a rod member, legs pivoted to one end of said rod member and adjustable toward and away from each other, means at the lower ends of said legs for engaging the corners or edges of the plates to be twirled, and means for clamping said legs in adjusted position.

5. A twirling device comprising a rod member, legs pivoted to one end of said rod member and adjustable toward and away from each other, and means for supporting and rotating said rod member.

6. A twirling device comprising a rod member, legs pivoted at one end of said rod member and adjustable toward and away from each other, and means for supporting and rotating said rod member comprising a vertical shaft having driving means on one end thereof and means on the other end to which said rod member is detachably secured, said rod member and said shaft being so joined as to prevent the rod member from swinging during the rotation thereof.

7. A twirling device including a plate holding means comprising a rod member having depending legs thereon adjustable toward and from each other, means for rotating the plate holding device, and an oven enclosing said plate holding device.

8. A twirling device including a plate holding means comprising a rod member having depending legs thereon adjustable toward and from each other, and means for preventing said legs from swinging, means for rotating the plate holding device, and an oven enclosing said plate holding device, 9. A twirling device including a plate holding means comprising a rod member having depending legs thereon adjustable toward and from each other, means for rotating the plate holding device, and an oven enclosing said plate holding device, said oven serving as a support for the rotating means.

10. A twirling device comprising a rod member, legs pivoted to one end of said rod member and adjustable toward and from each other, means for supporting and rotating said rod member comprising a vertical shaft having a driving means on one end thereof, and means on the other end to which said rod member is detachably connected, an oven enclosing said rod and legs and providing a support for said vertical shaft, and means for heating the oven.

11. The combination with an oven having means therein for heating the same, of a plate twirler comprising a shaft extending through the top thereof, said shaft being provided at the top end thereof with a driving means and at the lower end with a plate holding means.

12. The combination with an oven having means therein for heating the same, of a plate twirler comprising a shaft extending through the top thereof, said shaft being provided at its top end with a driving means and its lower end with a plate holding means, said plate holding means being adjustable to plates of various sizes and being detachably secured to the lower end of said shaft.

In testimony whereof I hereunto affix my signature in presence of two witnesses.

JAMES A. CAREY.

Witnesses:
   Lois Wineman,
   Wm. H. Parmelee.